US010075550B2

(12) United States Patent
Bonnet et al.

(10) Patent No.: US 10,075,550 B2
(45) Date of Patent: Sep. 11, 2018

(54) METHOD OF REDIRECTING DATA STREAMS FROM A MOBILE ACCOUNT TO ANOTHER MOBILE ACCOUNT

(71) Applicant: Orange, Paris (FR)

(72) Inventors: Cedric Bonnet, Issy les Moulineaux (FR); Marc Balon, Vilers-la-Ville (BE)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 15/542,279

(22) PCT Filed: Jan. 6, 2016

(86) PCT No.: PCT/FR2016/050015
§ 371 (c)(1),
(2) Date: Jul. 7, 2017

(87) PCT Pub. No.: WO2016/110645
PCT Pub. Date: Jul. 14, 2016

(65) Prior Publication Data
US 2017/0366634 A1 Dec. 21, 2017

(30) Foreign Application Priority Data
Jan. 7, 2015 (FR) ...................................... 15 50109

(51) Int. Cl.
*H04L 29/08* (2006.01)
*H04L 12/46* (2006.01)
*H04M 15/00* (2006.01)
*H04W 60/04* (2009.01)
*H04L 29/12* (2006.01)

(52) U.S. Cl.
CPC ...... *H04L 67/2814* (2013.01); *H04L 12/4633* (2013.01); *H04L 61/1511* (2013.01); *H04L 61/2007* (2013.01); *H04L 61/3075* (2013.01); *H04M 15/50* (2013.01); *H04W 60/04* (2013.01)

(58) Field of Classification Search
CPC ............. H04L 67/2814; H04L 12/4633; H04L 61/2007; H04L 61/1511; H04L 61/3075; H04M 15/50; H04W 60/04
See application file for complete search history.

(56) References Cited

U.S. PATENT DOCUMENTS

| 2009/0182675 A1* | 7/2009 | Brody ............... G06Q 20/10 705/72 |
| 2013/0315161 A1 | 11/2013 | Luna et al. |
| 2014/0071967 A1 | 3/2014 | Velasco |
| 2015/0186803 A1* | 7/2015 | Stong ................ G06Q 10/02 705/5 |
| 2016/0127898 A1* | 5/2016 | Gupta ................ H04W 12/06 726/7 |

FOREIGN PATENT DOCUMENTS

| EP | 1748662 A1 | 1/2007 |
| WO | 2004075579 A2 | 9/2004 |

OTHER PUBLICATIONS

International Search Report dated Mar. 15, 2016 for corresponding International Application No. PCT/FR2016/050015, filed Jan. 1, 2016.
English translation of the International Written Opinion dated Mar. 22, 2016 for corresponding International Application No. PCT/FR2016/050015, filed Jan. 1, 2016.

* cited by examiner

*Primary Examiner* — Brandon J Miller
(74) *Attorney, Agent, or Firm* — David D. Brush; Westman, Champlin & Koelher, P.A.

(57) ABSTRACT

A method of redirecting data streams exchanged by a mobile terminal associated with a "third-party" account, with a first telecommunications network. The method includes a prior stage including: the first network receiving from the mobile terminal a registration request, and recovering the profile of the third-party account; the first network sending a DNS request including a "redirection" access point name; the DNS system responding by supplying the IP address of a "stream redirection" server; the first network setting up a tunnel between the server and the mobile terminal, by providing the server with at least one identifier of the third-party account; the server supplying a second telecommunications network with which the user of the mobile terminal holds a personal account that is distinct from the third-party account, with at least one identifier of the personal account; and the stream redirection server setting up a tunnel with the second network.

11 Claims, No Drawings

METHOD OF REDIRECTING DATA STREAMS FROM A MOBILE ACCOUNT TO ANOTHER MOBILE ACCOUNT

CROSS-REFERENCE TO RELATED APPLICATIONS

This Application is a Section 371 National Stage Application of International Application No. PCT/FR2016/0500015, filed Jan. 6, 2016, the content of which is incorporated herein by reference in its entirety, and published as WO 2016/110645 on Jul. 14, 2016, not in English.

FIELD OF THE DISCLOSURE

The present invention relates to mobile telecommunications networks. It relates more particularly to networks capable of operating in packet mode, i.e. using data packet switching (PS), e.g. a general packet radio service (GPRS) network, or a universal mobile telecommunications system (UMTS) network, or indeed an evolved packet system (EPS) network, possibly including a WiFi network.

The invention relates even more particularly to associating a (sent or received) data stream with an account other than the account that is associated with the mobile terminal sending or receiving the data stream.

BACKGROUND OF THE DISCLOSURE

The problem addressed by the invention is initially illustrated on the basis of two concrete examples.

In a first example, a car manufacturer sells a car having a mobile terminal enabling backseat passengers in particular to watch videos, and the manufacturer takes charge of the subscription to the mobile account associated with the mobile terminal. The data exchanged by means of this mobile account may comprise "infotainment" and possibly also telemetry data (e.g. from sensors sensing the operation of parts of the car, or sensors sensing the behavior of the driver in order to give the driver periodic advice about the way he or she is driving). The sale price of the car then includes the mobile subscription for a certain duration. The mobile account is in the name of the manufacturer, and all network consumption by the mobile terminal is billed to the manufacturer.

In order to avoid the cost price of the car being evaluated on the basis of an erroneous estimate of this network consumption, the car manufacturer would like to pay for telemetry data only, with the consumption of infotainment being billed directly to the user by the car manufacturer (which ends up being billed for all of these uses by the telecommunications operator providing the mobile subscription).

A drawback of such a solution is that it obliges the user to subscribe to a mobile subscription with said telecommunications operator which might, a priori, be an operator other than the operator with which the user is already a subscriber for the user's personal or business mobile terminal. In addition, a priori, the user would not have access to personal services to which the user has subscribed in the context of the personal or business mobile account, e.g. secure access to the business, access to a premium service including specific audiovisual services, real time consultation of consumption, etc.

In a second example, a camera manufacturer might desire to fit all cameras with a SIM card enabling clients to send the photos they have taken anywhere in the world directly to their personal cloud storage space so as to make them accessible to their families or friends. In the prior art, in order to do this, the user of such a camera would need to subscribe to an additional network subscription, and the camera would not enable that user to verify network consumption in real time.

SUMMARY

In a first aspect, the present invention thus provides a method of redirecting data streams exchanged by a mobile terminal associated with an account, referred to as a third-party account, with a telecommunications network referred to as the first network. Said method includes a prior stage comprising the following steps:

said first network receiving from said mobile terminal a registration request, and recovering the profile of said third-party account;

the first network sending a domain name system (DNS) request including an access point name (APN), referred to as a redirection APN;

the DNS system responding by supplying the Internet protocol (IP) address of at least one server, referred to as the stream redirection server;

the first network setting up a tunnel between said stream redirection server and the mobile terminal, by providing the stream redirection server with at least one identifier of said third-party account;

the stream redirection server supplying a telecommunications network, referred to as the second network, with which the user of the mobile terminal holds an account, referred to as a personal account, that is distinct from the third-party account, with at least one identifier of said personal account; and the stream redirection server setting up a tunnel with said second network.

It should be observed that said first telecommunications network and said second telecommunications network may be identical or they may be distinct. It should also be observed that said personal account may optionally be associated with a personal or a business mobile terminal, that is distinct from said mobile terminal associated with the third-party account.

By means of these provisions, the mobile terminal associated with the third-party account is put into communication, via said stream redirection server, with the telecommunications network where the user of the mobile terminal holds his or her personal account. The user therefore has no need to take out a subscription with the first network in order to benefit from packet mode communications services, and this applies in spite of the fact that the mobile terminal proper is associated with an account (other than the personal account) with that first network; in the first above example, the holder of the third-party account remains the car manufacturer, and in the second above example, the holder of the third-party account remains the camera manufacturer.

According to particular characteristics, said method subsequently comprises the following steps:

said second network allocating to said mobile terminal an IP address, referred to as the second IP address, and transmitting said second IP address to said stream redirection server; and the stream redirection server allocating to the mobile terminal an IP address referred to as the first IP address, that is optionally identical to said second IP address, and sending said first IP address to the mobile terminal.

The nature of this first IP address may be determined depending on a network policy: it may be identical to the address of the mobile terminal as seen by the second network, or to the address of the mobile terminal as seen by the first network, or indeed it may be different from both of these IP addresses.

By means of these provisions, a certain IP address (said first IP address) is attributed to the mobile terminal for all of its future communications with the stream redirection server, but it is nevertheless possible to separate communications between the mobile terminal and the first network from communications between the mobile terminal and the second network.

According to particular characteristics, after said prior stage, the mobile terminal exchanges data referred to as personal data with said second network via said stream redirection server.

By means of these provisions, the user of the terminal can access all of the services subscribed to via that user's personal account, and can discover his or her own personal consumption in real time. In addition, the operator of the second network can conveniently bill this personal consumption directly to the user, at the agreed periodicity.

According to other particular characteristics, after said prior stage, the mobile terminal exchanges data, referred to as third-party data, with said first network, via said stream redirection server.

By means of these provisions, the holder of the third-party account can receive telemetry data that it finds useful, e.g. technical information collected by the mobile terminal and relating to the physical environment or the ecosystem of the mobile terminal.

Correspondingly, in a second aspect, the invention also provides a server referred to as a stream redirection server and comprising means for:
  receiving, from a telecommunications network, referred to as a first network, at least one identifier of an account, referred to as a third-party account, held by a mobile terminal with said first network, and setting up a tunnel with the first network;
  supplying a telecommunications network, referred to as a second network, with which the user of the mobile terminal holds an account, referred to as a personal account, that is distinct from said third-party account, with at least one identifier of said personal account; and setting up a tunnel with said second network.

According to particular characteristics, said stream redirection server further comprises means for:
  receiving from said second network an IP address referred to as a second IP address, that is allocated to said mobile terminal; and
  allocating to the mobile terminal an IP address, referred to as the first IP address, that is optionally identical to said second IP address, and sending said first IP address to the mobile terminal.

According to other particular characteristics, said stream redirection server further comprises means for:
  receiving from said mobile terminal data, referred to as uplink personal data, and retransmitting said uplink personal data to said second network; and
  receiving from the second network, data, referred to as downlink personal data, and retransmitting said downlink personal data to the mobile terminal.

According to yet other particular characteristics, said data stream redirection server further comprises means for:
  receiving from said mobile terminal, data, referred to as uplink third-party data, and retransmitting said uplink third-party data to the first network; and
  receiving from the first network, data, referred to as downlink third-party data, and retransmitting said downlink third-party data to the mobile terminal.

According to still more particular characteristics, said stream redirection server further comprises means for separating the personal data stream from the third-party data stream when it receives both streams simultaneously.

The advantages made available by this stream redirection server are essentially the same as those made available by the corresponding methods set out briefly above.

It should be observed that it is possible for the stream redirection server to be implemented in the context of software instructions and/or in the context of electronic circuits.

In a third aspect, the invention provides a data stream redirection system comprising:
  at least one data stream redirection server as described briefly above;
  a domain name system (DNS) associating an access point name, referred to as a redirection APN, with the Internet protocol (IP) address of said stream redirection server; and
  at least one mobile terminal configured to send a registration request containing a reference to said redirection APN.

The advantages made available by this data stream redirection system are essentially the same as those made available by the data stream redirection methods set out briefly above.

The invention also provides a computer program downloadable from a communications network and/or stored on a computer-readable medium and/or executable by a microprocessor. The computer program is remarkable in that it comprises instructions for executing steps of the data stream redirection method set out briefly above, when it is executed on a computer.

The advantages made available by the computer program are essentially the same as those made available by said methods.

Other aspects and advantages of the invention appear on reading the following detailed description of particular implementations, given as non-limiting examples.

DETAILED DESCRIPTION OF ILLUSTRATIVE EMBODIMENTS

There follows a description of the steps of a prior stage in an implementation of the invention, which steps serve to set up an appropriate ecosystem.

Consideration is given to a mobile terminal that possesses an account, referred to as a third-party account, with a telecommunications network, referred to as a first network. The mobile terminal may be physically situated in the first network, or it may be in a roaming situation, i.e. visiting some other network, referred to as the visited network.

In a first step, the first network receives a registration request from the mobile terminal (where appropriate via a visited network). In conventional manner, the first network then recovers the profile of the third-party account. In the present implementation, this profile mentions an access point name (APN) that is referred to as the redirection APN and that is dedicated to performing the present invention.

In this respect, an APN is an identifier that enables a user of a mobile network to connect to an IP core network from a packet data network (PDN) by identifying the interconnection server (e.g. a gateway GPRS support node (GGSN) in the GPRS and UMTS technologies, or a PDN-gateway (PDN-GW) server in the EPS technology), that the user seeks to use.

Optionally, provision may be made for the registration requests sent by the mobile terminal to contain a reference to said redirection APN so as to enable the first network to verify access rights by comparison with the redirection APN mentioned in the profile of the third-party account. For this purpose, said reference may conveniently be configured in the connection parameters of the mobile terminal.

In a second step, said first network sends a domain name system (DNS) request including in particular:
 a mobile country code (MCC);
 an identifier of the operator of the network or mobile network code (MNC); and
 the redirection APN.

In a third step, in the light of the information present in the request, the DNS system responds by supplying the IP address of at least one server of the invention, referred to as the stream redirection server (SRS).

In a fourth step, the first network (and also the visited network, if any) set(s) up a tunnel such as a session tunnel in compliance with the GPRS tunneling protocol (GTP) between the SRS server and the mobile terminal. In so doing, the first network provides the SRS server with at least one identifier, e.g. the international mobile subscriber identity (IMSI) and/or the mobile station integrated services digital network (MSISDN) of said third-party account.

In a fifth step, the SRS server (which has been provisioned for this purpose and which has real time access to an external database) supplies at least one account identifier to a telecommunications network, referred to as the second network, with which the user of the mobile terminal holds an account, referred to as the personal account, that is distinct from the third-party account, which at least one account identifier, e.g. the IMSI and/or the MSISDN, is of an identifier personal account, and the SRS server sets up a tunnel, such as a GTP session tunnel, with said second network, by creating an appropriate signaling interface.

It should be observed that in addition to said signaling interface, other interfaces between the first network and the second network may be set up, either during this step or subsequently. To do this, it may be convenient to use interface formats conventionally used in the context of roaming; by way of example, these interfaces may be as follows:
 a billing interface, e.g. using a compensation agent of the data clearinghouse type, as provided for in the transferred account procedures (TAPs); or
 a payment interface, e.g. using a compensation institute of the financial clearinghouse type.

Furthermore, the SRS server may optionally also provide the second network with one or more elements of service information useful for performing the invention, e.g. for the purpose of facilitating billing operations between the first network and the second network. Such an element of information may in particular be in the form of a service access point name (APN).

In a sixth step, the second network allocates an IP address, referred to as the second IP address, to the mobile terminal, and transmits said second IP address to the SRS server.

Finally, in a seventh step, the SRS server allocates an IP address, referred to as the first IP address, to the mobile terminal, which first IP address may optionally be identical to the second IP address, and it sends said first IP address to the mobile terminal.

Once this prior stage has been completed, the user of the mobile terminal can exchange personal data via the SRS server with the second network, which second network then handles the personal data in exactly the same manner as it would handle any other data stream associated with a personal (or business) mobile terminal of the user. This exchange of data thus advantageously benefits from conditions laid down in the user's personal account.

Optionally, the mobile terminal may also exchange third-party data (such as telemetry data in the first above example) with the third-party account, via said SRS server. Under such circumstances, provision is preferably made for said SRS server to be capable of separating the personal data stream from the third-party data stream when it receives both streams simultaneously. In a first variant, the streams are separated on the basis of respective access point names (APNs) used by the terminal for the respective streams; in a second variant, the SRS server undertakes to identify the types of stream from among the streams it receives on the basis of transport parameters, such as IP addresses, ports, protocols, and so on.

To terminate, it may be observed that the invention can be performed within communications network nodes, in particular data stream redirection servers or mobile terminals, by using software and/or hardware components.

The software components may be incorporated in a conventional computer program for managing a network node. That is why, as mentioned above, the present invention also provides a computer system. In conventional manner, the computer system comprises a central processor unit using signals to control a memory, and also an input unit and an output unit. Furthermore, the computer system may be used to perform a computer program comprising instructions for performing any of the data stream redirection methods of the invention.

Specifically, the invention also provides a computer program downloadable from a communications network and comprising instructions for executing steps of a data stream redirection method of the invention when it is executed on a computer. The computer program may be stored in a computer-readable medium and may be executable by a microprocessor.

The program may use any programming language, and be in the form of source code, object code, or code intermediate between source code and object code, such as in a partially complied form, or in any other desirable form.

The invention also provides a non-removable or a partially or totally removable data medium that is readable by a computer and that comprises instructions of a computer program as mentioned above.

The data medium may be any entity or device capable of storing the program. For example, the medium may comprise storage means such as a read only memory (ROM), e.g. a compact disk (CD) ROM or a microelectronic circuit ROM, or magnetic recording means, such as a hard disk, or indeed a universal serial bus (USB) flash drive.

Furthermore, the data medium may be a transmissible medium such as an electrical or optical signal, suitable for being conveyed via an electrical or optical cable, by radio, or by other means. The computer program of the invention may in particular be downloaded from an Internet type network.

In a variant, the data medium may be an integrated circuit in which the program is incorporated, the circuit being adapted to execute or to be used in the execution of any one of the data stream redirection methods of the invention.

Although the present disclosure has been described with reference to one or more examples, workers skilled in the art will recognize that changes may be made in form and detail without departing from the scope of the disclosure and/or the appended claims.

The invention claimed is:

1. A method of redirecting data streams exchanged by a mobile terminal associated with an account, referred to as a third-party account, with a telecommunications network referred to as the first network, said method including a prior stage comprising the following acts:
    said first network receiving from said mobile terminal a registration request, and recovering the profile of said third-party account;
    the first network sending a domain name system (DNS) request including an access point name (APN) referred to as a redirection APN;
    the DNS system responding by supplying the Internet protocol (IP) address of at least one server, referred to as the stream redirection server;
    the first network setting up a tunnel between said stream redirection server and the mobile terminal, by providing the stream redirection server with at least one identifier of said third-party account;
    the stream redirection server supplying a telecommunications network, referred to as the second network, with which the user of the mobile terminal holds an account, referred to as a personal account, that is distinct from the third-party account, with at least one identifier of said personal account; and
    the stream redirection server setting up a tunnel with said second network.

2. The data stream redirection method according to claim 1, wherein the method subsequently comprises the following acts:
    said second network allocating to said mobile terminal an IP address, referred to as the second IP address, and transmitting said second IP address to said stream redirection server; and
    the stream redirection server allocating to the mobile terminal an IP address referred to as the first IP address, that is optionally identical to said second IP address, and sending said first IP address to the mobile terminal.

3. The data stream redirection method according to claim 1, wherein after said prior stage, the mobile terminal exchanges data referred to as personal data with said second network via said stream redirection server.

4. The data stream redirection method according to claim 1 wherein, after said prior stage, the mobile terminal exchanges data, referred to as third-party data, with said first network, via said stream redirection server.

5. The data stream redirection server according to claim 1, wherein the instructions further configure the stream redirection server to:
    receive from said mobile terminal, data, referred to as uplink third-party data, and retransmit said uplink third-party data to the first network; and
    receive from the first network, data, referred to as downlink third-party data, and retransmit said downlink third-party data to the mobile terminal.

6. A server, referred to as a stream redirection server and comprising:
    a processor; and
    a non-transitory computer-readable data medium comprising instructions of a computer program stored thereon, which when executed by the processor configure the stream redirection server to:
    receive, from a telecommunications network, referred to as a first network, at least one identifier of an account, referred to as a third-party account, held by a mobile terminal with said first network, and set up a tunnel with the first network;
    supply a telecommunications network, referred to as a second network, with which the user of the mobile terminal holds an account, referred to as a personal account, that is distinct from said third-party account, with at least one identifier of said personal account; and
    set up a tunnel with said second network.

7. The stream redirection server according to claim 6, wherein the instructions further configure the stream redirection server to:
    receive from said second network an Internet protocol (IP) address referred to as a second IP address, that is allocated to said mobile terminal; and
    allocate to the mobile terminal an IP address, referred to as the first IP address, that is optionally identical to said second IP address, and send said first IP address to the mobile terminal.

8. The stream redirection server according to claim 6, wherein the instructions further configure the stream redirection server to:
    supply information to the second network for enabling billing operations to be carried out between the first network and the second network.

9. The stream redirection server according to claim 6, wherein the instructions further configure the stream redirection server to:
    receive from said mobile terminal data, referred to as uplink personal data, and retransmit said uplink personal data to said second network; and
    receive from the second network, data, referred to as downlink personal data, and retransmit said downlink personal data to the mobile terminal.

10. The data stream redirection server according to claim 9, wherein the instructions further configure the stream redirection server to:
    receive from said mobile terminal, data, referred to as uplink third-party data, and retransmit said uplink third-party data to the first network;
    receive from the first network, data, referred to as downlink third-party data, and retransmit said downlink third-party data to the mobile terminal;
    separate a personal data stream from a third-party data stream when it receives both streams simultaneously.

11. A non-transitory computer-readable data storage medium comprising computer program code instructions stored thereon for executing a data stream redirection method when the instructions are executed by a processor of a stream redirection server, wherein the instructions configure the stream redirection server to:
    receive, from a telecommunications network, referred to as a first network, at least one identifier of an account, referred to as a third-party account, held by a mobile terminal with said first network, and set up a tunnel with the first network;
    supply a telecommunications network, referred to as a second network, with which the user of the mobile terminal holds an account, referred to as a personal account, that is distinct from said third-party account, with at least one identifier of said personal account; and
    set up a tunnel with said second network.

* * * * *